US012621543B2

(12) United States Patent
Rivoalen et al.

(10) Patent No.: US 12,621,543 B2
(45) Date of Patent: May 5, 2026

(54) METHOD FOR MANAGING TRANSMISSION OF A CONTENT PROTECTED AGAINST COPYING TO A RENDERING DEVICE

(71) Applicant: Orange, Issy-les-Moulineaux (FR)

(72) Inventors: Mathieu Rivoalen, Chatillon (FR); Hervé Marchand, Chatillon (FR)

(73) Assignee: ORANGE

( * ) Notice: Subject to any disclaimer, the term of this patent is extended or adjusted under 35 U.S.C. 154(b) by 335 days.

(21) Appl. No.: 17/741,840

(22) Filed: May 11, 2022

(65) Prior Publication Data

US 2022/0382835 A1     Dec. 1, 2022

(30) Foreign Application Priority Data

May 27, 2021    (FR) ........................................ 2105525

(51) Int. Cl.
H04N 21/835          (2011.01)
G06F 21/10           (2013.01)

(52) U.S. Cl.
CPC ....... H04N 21/835 (2013.01); G06F 21/1062 (2023.08)

(58) Field of Classification Search
CPC ........................... H04N 21/835; G06F 21/1062
See application file for complete search history.

(56) References Cited

U.S. PATENT DOCUMENTS 6,895,555 B1 *  5/2005  Ando ................. H04N 21/4542
                                                         715/848
7,571,016 B2 *  8/2009  Rahman ................... G06F 21/10
                                                         381/119

8,194,088 B1     6/2012  Paquette
9,049,208 B2 *   6/2015  Chen ........................ H04L 63/18
9,280,773 B1 *   3/2016  Evans ................. G06Q 20/4014
10,102,648 B1 * 10/2018  Vannier ............... G06F 11/3003
2005/0262022 A1 * 11/2005 Oliveira .................. G06F 21/10
                                                         705/51
2006/0023883 A1 *  2/2006 Konetski ................. G06F 21/85
                                                         348/E5.002
2007/0269044 A1 * 11/2007 Bruestle .................. G06F 21/10
                                                         380/54
2008/0037780 A1 *  2/2008 Layton ............... H04N 21/4627
                                                         375/E7.009
2008/0152305 A1 *  6/2008 Ziegler ............. H04N 21/4147
                                                         386/E5.07

(Continued)

OTHER PUBLICATIONS

French Search Report and Written Opinion dated Feb. 16, 2022 for corresponding French Application No. 2105525, filed May 27, 2021.

*Primary Examiner* — Techane Gergiso
(74) *Attorney, Agent, or Firm* — David D. Brush; Westman, Champlin & Koehler, P.A.

(57)          ABSTRACT

A method for managing transmission of a multimedia content protected against copying, referred to as the protected content, from a reader terminal to a rendering device via a communication link with a view to a rendition on the rendering device. The reader terminal includes a first protective module. The method includes verifying presence on the rendering device of a second protective module compatible with the first protective module, and, in the negative case, transmitting, via the communication link, a request to render an unprotected content instead of the protected content.

8 Claims, 2 Drawing Sheets

(56)                References Cited

U.S. PATENT DOCUMENTS

| 2010/0287609 | A1* | 11/2010 | Gonzalez | ......... | H04N 21/64322 |
| | | | | | 726/14 |
| 2011/0191859 | A1* | 8/2011 | Naslund | .......... | H04N 21/63345 |
| | | | | | 726/27 |
| 2011/0261957 | A1* | 10/2011 | Catrein | ............... | H04N 21/835 |
| | | | | | 380/278 |
| 2013/0132735 | A1* | 5/2013 | Kottilingal | .............. | G06F 21/79 |
| | | | | | 713/189 |
| 2013/0305342 | A1* | 11/2013 | Kottilingal | ....... | H04N 21/42623 |
| | | | | | 726/29 |
| 2013/0346316 | A1* | 12/2013 | Pendakur | .......... | G06Q 30/0241 |
| | | | | | 705/50 |
| 2014/0196159 | A1 | 7/2014 | Mangalam-Palli et al. | | |
| 2014/0337929 | A1* | 11/2014 | Lee | .................... | H04N 21/4126 |
| | | | | | 726/4 |
| 2014/0365856 | A1* | 12/2014 | Costa-Requena | ..... | H04L 67/025 |
| | | | | | 715/205 |
| 2015/0020210 | A1* | 1/2015 | Brown | .................... | G06F 21/60 |
| | | | | | 726/27 |
| 2016/0063224 | A1* | 3/2016 | Raley | .................... | H04L 67/535 |
| | | | | | 726/29 |
| 2017/0005790 | A1* | 1/2017 | Brockmann | ............ | H04L 63/06 |
| 2018/0113666 | A1* | 4/2018 | Knepper | .............. | G06F 1/1647 |
| 2018/0359539 | A1* | 12/2018 | Hongal | ................... | G06F 21/10 |
| 2019/0042778 | A1* | 2/2019 | Sukhomlinov | ..... | G06F 21/6245 |
| 2021/0200882 | A1* | 7/2021 | Maor | .................... | H04L 9/0897 |
| 2021/0334397 | A1* | 10/2021 | Taylor | ................ | G06F 21/6209 |
| 2022/0224987 | A1* | 7/2022 | Nazirudeen | ........ | H04N 21/4367 |

* cited by examiner

[Fig. 1]
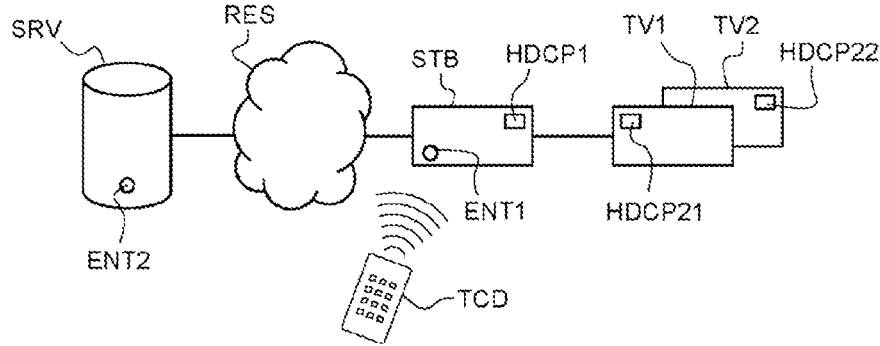
[Fig. 2]
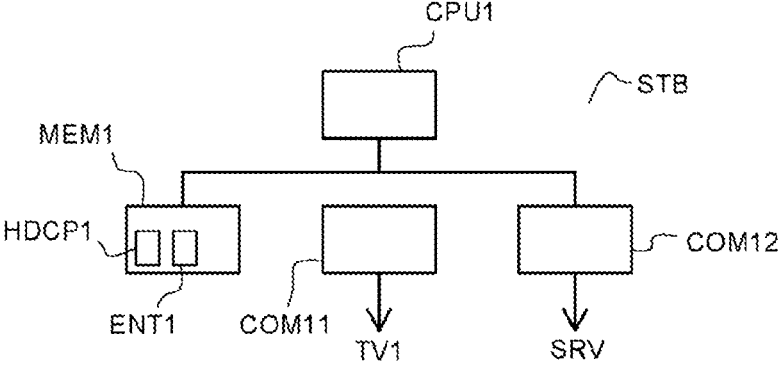
[Fig. 3]
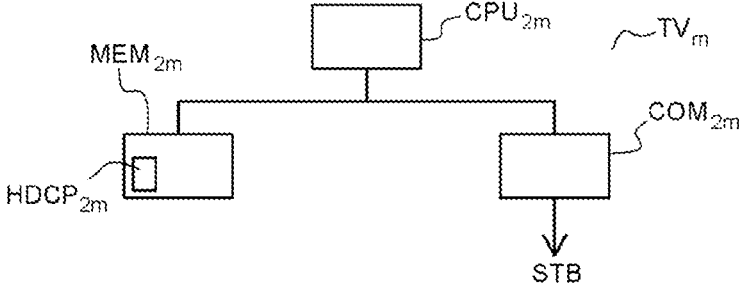

[Fig. 4]
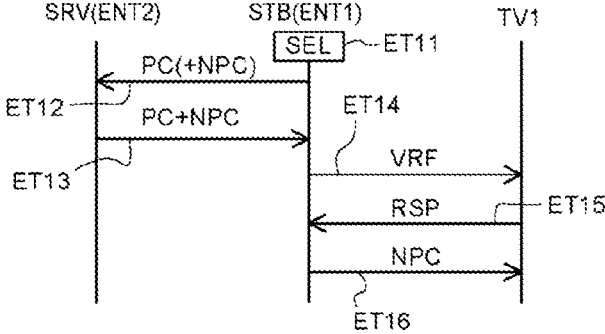
[Fig. 5]
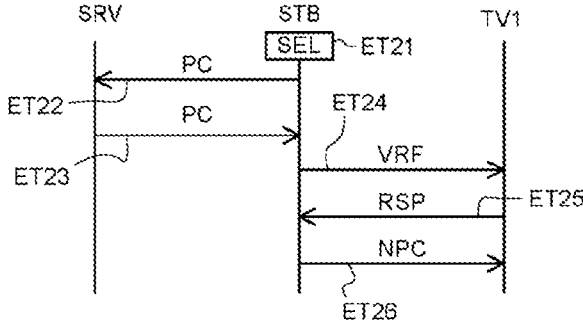
[Fig. 6]
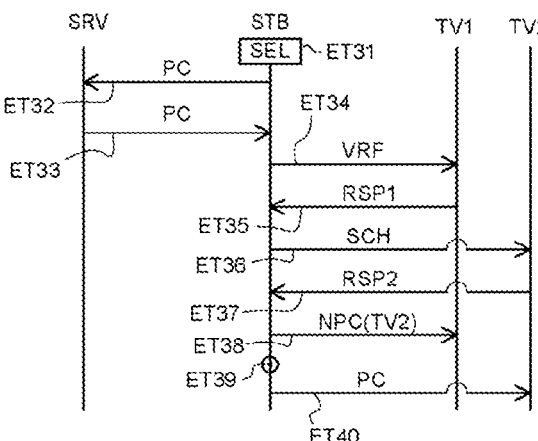

1

METHOD FOR MANAGING TRANSMISSION OF A CONTENT PROTECTED AGAINST COPYING TO A RENDERING DEVICE

TECHNICAL FIELD

The present disclosure relates to a method for managing transmission of a content protected against copying to a rendering device.

The present disclosure targets systems including a reader terminal that is able to read digital multimedia content, and a rendering device able to render the multimedia content.

A reader terminal is for example a digital-television decoder, a games console, a Blu-ray player or equivalent, etc.

A rendering device is any terminal capable of rendering an audio and/or video content. A rendering device is for example a television set, a sound bar, a home-cinema amplifier, a video projector, etc.

The reader terminal and the rendering device communicate via a communication link. Said communication link may be of any type. It may be wired or wireless. It will be seen below that, in one example of embodiment, the link chosen to illustrate the invention is a wired link of HDMI type.

PRIOR ART

At the present time, systems for protecting digital content against copying already exist. Among known solutions, a protective system referred to as HDCP (acronym of high-bandwidth digital content protection) was developed to protect against copying digital content transiting over DVI or HDMI communication links (DVI being the acronym of digital visual interface and HDMI being the acronym of high-definition multimedia interface). These protective systems aim to protect digital content, i.e. to prevent digital copying thereof, following transmission of the content to a rendering device.

An HDCP protective module installed on a given piece of equipment in general operates in association with a controller, for example an HDMI controller or a DVI controller, installed on the piece of equipment. Furthermore, there are a number of versions of HDCP protection (or levels of protection).

A content is transmitted from a reader terminal to a rendering device only if the versions of the protective modules are compatible. Concretely, when a content must be transmitted by the reader terminal to a rendering device, the reader terminal, before transmitting the content to the rendering device, carries out a verifying phase (also called the "negotiating" phase in the art) during which the reader terminal verifies whether a protective module is present on the terminal that is the intended recipient of the content; if so, the reader terminal verifies the version of the protective module installed on the rendering device; and, on receipt of the version of the protective module, this version is compared with the version of the module installed on the reader terminal.

If the versions are compatible, the content is transmitted by the reader terminal to the rendering device with a view to rendition thereon.

In contrast, if the versions are not compatible, or if the rendering device is devoid of a protective module, the multimedia content is not transmitted by the reader terminal to the rendering device. This incompatibility or the absence of a protective module results in a black screen being displayed on the screen of the rendering device; this is unacceptable in terms of user experience.

SUMMARY

To this end, an exemplary aspect of the present disclosure relates to a method for managing transmission of a multimedia content protected against copying, referred to as the protected content, from a reader terminal to a rendering device via a communication link with a view to a rendition on the rendering device, the reader terminal comprising a first protective module, the method comprising a step of verifying the presence on the rendering device of a second protective module compatible with the first protective module; and, in the negative case, a step of transmitting, via the communication link, a request to render an unprotected content instead of the protected content.

This solution ensures that a content other than the requested content is rendered when the rendering device is devoid of a protective module or, in the case where the rendering device is equipped with a protective module, the protective modules are incompatible with each other and transmission of the protected content is not possible.

An exemplary embodiment of the present disclosure avoids a user expecting to view or listen to the content being subjected to a wait that is futile given that it does not end with rendition of the content. According to the invention, a content is rendered whatever happens.

According to a first embodiment, the verifying step is preceded by a step of receiving the protected content and the unprotected content from a communication network. This first embodiment is advantageous because the unprotected content may be transmitted by the sender of the protected content. The sender may for example associate, with each protected content, a judiciously chosen unprotected content. For example, if the protected content is a film, the unprotected content is for example the first few minutes of the film or an extract from the film. This first embodiment relieves the reader terminal of the responsibility of making the choice of the unprotected content to be rendered.

According to one variant of this first embodiment, the receiving step is preceded by a step of transmitting a request to access the protected content, and the request further includes a request to receive an unprotected content. This variant is advantageous for example when the reader terminal has not been provided with any unprotected content to deliver instead of the protected content. This variant also avoids the sender of the protected content having to transmit an unprotected content on each transmission of a protected content.

According to one particular second embodiment of the disclosure, which will possibly be employed as an alternative or in addition to the preceding embodiment, the unprotected content is obtained from a memory included in the rendering device. This second embodiment requires no modifications by the sender delivering the content; this second embodiment relieves the content provider from having to send the unprotected content. In this second embodiment, the reader terminal is responsible for storing the unprotected content and the type of unprotected content to be rendered.

According to a third embodiment of the disclosure, which will possibly be employed as an alternative or in addition to the preceding embodiments, the transmitting step is preceded by a step of searching for another rendering device equipped with a third protective module compatible with the first protective module; if a compatible third protective module is found, the unprotected content transmitted in the transmitting step includes a datum representative of the result of the search. This third embodiment is in particular advantageous when it is combined with the first embodiment because the first few minutes of the film are rendered, the rest of the film being watchable on this other rendering device. This embodiment ensures a quasi-continuity in the rendition by switching the rendition of the content from the first rendering device to the second rendering device.

Following rendition of the option to use another rendering device, a user may parametrize the reader terminal so as to modify the rendering device chosen by default so as to replace it with the located TV-rendering device the protective module of which is compatible.

According to one variant of the third embodiment, following the transmitting step, receipt of a datum representative of a validation triggers a step of requesting rendition of the protected content on said other rendering device. This variant requires a validation by a user, for example by means of a control device. When the reader terminal receives a datum representative of the validation, obtained from the remote control, the reader terminal selects the located rendering device and requests the protected content be rendered on this located TV-rendering device rendering device.

According to one hardware aspect, an exemplary embodiment of the present disclosure relates to an entity for managing transmission of a protected multimedia content from a reader terminal to a rendering device via a communication link, the reader terminal being able to receive protected contents with a view to rendition thereof on the rendering device, the reader terminal comprising a first protective module, the entity comprising:

a. a module for verifying the presence on the rendering device of a second protective module compatible with the first protective module;

b. a transmitting module able to transmit, depending on the result obtained by the searching module, a request to render, via the communication link, an unprotected content instead of the protected content.

According to another hardware aspect, an exemplary embodiment of the present disclosure relates to a computer program able to be implemented in a managing entity such as defined above, said program comprising code instructions that, when the program is executed, perform the steps defined in the method defined above.

According to another hardware aspect, an exemplary embodiment relates to a storage medium readable by a data processor and on which is stored a program comprising program-code instructions for executing the steps of the method defined above.

According to another functional aspect, an exemplary embodiment relates to a method for managing transmission of a multimedia content protected against copying, referred to as the protected content, characterized in that it comprises:

a step of receiving a request to access a multimedia content protected against copying;

a step of transmitting the requested content and a content not protected against copying.

According to another hardware aspect, an exemplary embodiment relates to an entity, referred to as the second entity, for managing transmission of a multimedia content protected against copying, referred to as the protected content, characterized in that it comprises:

a module for receiving a request to access a multimedia content protected against copying;

a module for transmitting the requested content and a content not protected against copying.

According to another hardware aspect, an exemplary embodiment relates to a server characterized in that it comprises a second managing entity such as defined above.

According to another hardware aspect, an exemplary embodiment relates to a computer program able to be implemented in a managing entity such as defined above, said program comprising code instructions that, when the program is executed, perform the steps defined in the method defined with reference to said other functional aspect.

According to another hardware aspect, an exemplary embodiment relates to a storage medium readable by a data processor and on which is stored a program comprising program-code instructions for executing the steps of the method defined with reference to said other functional aspect.

It will be noted that the data medium may be any entity or device capable of storing the program. For example, the medium may comprise a storage means, such as a ROM, for example a CD-ROM or a microelectronic circuit ROM, or else a magnetic storage means, or a hard disk. Moreover, the data medium may be a transmissible medium such as an electrical or optical signal, which may be routed via an electrical or optical cable, by radio or by other means. The program according to an exemplary embodiment of the disclosure may in particular be downloaded from a network such as the Internet. As an alternative, the data medium may be an integrated circuit into which the program is incorporated, the circuit being designed to execute or to be used in the execution of the method in question.

BRIEF DESCRIPTION OF THE DRAWINGS

One or more embodiment of the present disclosure will be better understood on reading the following description, which is given by way of example and with reference to the appended drawings, in which:

FIG. 1 shows an IT system in which is illustrated one example of embodiment of the disclosure, in which embodiment the first terminal is a digital-television coder and the second terminal is a rendering device.

FIG. 2 is a schematic view of the circuits present in the first reader terminal.

FIG. 3 is a schematic view of the circuits present in the rendering device.

FIG. 4 is a schematic view of message exchanges in a first embodiment based on the fact that the server transmits both a protected content and an unprotected content able to replace the protected content when an incompatibility is detected between protective modules present in the reader terminal and the rendering device, respectively.

FIG. 5 is a schematic view of message exchanges in a second embodiment based on the fact that the unprotected content is stored in a memory of the reader terminal.

FIG. 6 is a schematic view of message exchanges according to a third embodiment in which the system comprises a plurality of rendering devices able to render a content.

DETAILED DESCRIPTION OF ILLUSTRATIVE EMBODIMENTS OF THE DISCLOSURE

FIG. 1 shows a system SYS comprising a first terminal STB and one or more rendering devices TVm ("m" is an integer). In our example, the system SYS comprises a first rendering device TV1 and a second rendering device TV2.

In our example, the first terminal is a decoder STB and the rendering devices are for example television sets.

In our example, the reader terminal STB is connected via a communication link LI to the first rendering device TV1 with a view to rendering thereon a digital content, a film for example. In our example, a rendering device is a television set, but could very well be a simple screen, a loudspeaker, etc. A wireless communication link, for example a Wi-Fi link, could have been used instead of the wired link.

The decoder STB is able to communicate with a server that delivers contents SRV via a communication network RES, the Internet for example. The server SRV stores contents of all sorts and in particular contents protected against copying. Access to these contents requires the presence of protective modules on the various terminals of the transmission pipeline, thus preventing the content from being copied by an unauthorized third party. These protective modules in general encrypt the content by means of a cryptographic encryption technique employing cryptography keys. We will not go into the details of the encryption because it is irrelevant to the description of the present disclosure.

In our example, a control device, a remote controller TCD for example, is able to control the decoder STB.

With reference to FIG. 2, the reader terminal STB conventionally includes a processor CPU1. The terminal further includes a storage module MEM1, especially for storing a managing entity ENT1 the function of which will be described below.

The reader terminal STB further comprises a communication module COM11 for communicating with a rendering device TVm. In our example, the communication module COM11 is an HDMI communication module. The reader terminal STB further comprises a communication module COM12 for communicating with the server SRV.

The decoder STB also stores a protective module HDCP1 that ensures protection of the protected contents against copying.

FIG. 3 is a schematic view of some of the electronic components of a rendering device TVm ("m" is an integer number designating the rendering device TVm, in our example m=2).

A rendering device TVm comprises a processor CPU2, a memory MEMm and a communication module COMm1 allowing a communication with the decoder STB via the link LI.

The rendering device TVm also stores a protective module HDCPm2 that ensures protection of the protected contents against copying.

As mentioned above, there are a number of levels of HDCP protection. Each protective module offers a given level of protection.

In practice, when a reader terminal is connected, for example via an HDMI link, to a rendering device, information is exchanged between the two terminals, especially information on their level of HDCP protection. The reader terminal carries out a negotiating phase during which it interrogates the rendering device to which it is connected, in order to determine its level of HDCP protection and to verify whether the respective protective modules HDCP1 and HDCP2*m* are compatible. This compatibility is a prerequisite of transmission by the decoder STB of protected contents to the TV-rendering device rendering device. If the protective modules are incompatible, the negotiating step is said to have failed.

For example, the copy protection of contents of 4K UHD resolution employs HDCP version 2.2. In this configuration, if the TV-rendering device does not offer the HDCP 2.2 protection level required by the decoder reader terminal STB, it is concluded that the protective modules are incompatible. Because of this incompatibility, the protected content is not transmitted by the reader terminal to the rendering device.

Therefore, to render a video content, for example a 4K UHD content delivered by a reader terminal, on a 4K television set, it is necessary not only for the reader terminal and the rendering device to both be equipped with respective protective modules, in our example HDMI controllers compatible with HDCP 2.2, but also for the HDCP 2.2 copy-protection standard to be implemented by the reader terminal and the rendering device, as otherwise the screen remains black.

The solution comprises, when the TV-rendering device is devoid of any protective module, or when there is an incompatibility between protective modules, a triggering step, in which step the decoder STB is made to begin to read a content not protected against copying, and a step of transmitting the content not protected against copying to the TV-rendering device rendering device instead of the protected content. The unprotected content is very obviously different from the protected content and does not require, because it is not protected against copying, any particular protection and therefore protective modules to be present in the various terminals.

In other words, when the protective modules present in the decoder STB and in the TV-rendering device are incompatible, and when therefore the negotiating step fails, an unprotected content NPC is transmitted instead of the protected content PC, from the decoder STB to the TV-rendering device.

The decoder STB and the server SRV are equipped with respective managing entities ENT1 and ENT2. In our example, these entities are stored in memories of the server SRV and of the decoder STB, respectively. In the embodiments described below, what is meant when steps are said to be carried out by the decoder STB or server is that these steps are carried out by the entities ENT1 and ENT2, respectively.

Various embodiments will now be described. These embodiments comprise steps referenced ETxy, "x" designating the embodiment in question, and "y" designating the step in question of the embodiment in question.

A first embodiment of the method of the present disclosure will now be described with reference to FIG. 4. In this embodiment, the content server SRV transmits both a protected content PC and an unprotected content NPC.

This first embodiment involves the rendering device TV1.

This first embodiment comprises the following steps ET11 to ET16.

In a first step ET11, a user selects SEL a content. This step is not essential. Specifically, the content may also be transmitted spontaneously by the content server without prior selection by the user.

In a second step ET12, the decoder STB asks to receive, from the server SRV, a selected content PC.

In a third step ET13, the server SRV transmits the requested content. The content PC is protected against copying; transmission and rendition thereof require a presence, in the decoder STB and in the rendering device TV1, of compatible protective modules HDCP1 and HDCP2.

In this embodiment, the server also transmits an unprotected content NPC. The latter may be transmitted before the protected content or in parallel with the protected content. The unprotected content NPC is transmitted by way of precautionary measure in case of incompatibility between protective modules. If there is actually an incompatibility, the unprotected content NPC, since it is stored in a memory of the decoder STB, will be able to be transmitted without delay to the rendering device TV1.

On receipt of the protected content PC, in a fourth step ET14, the decoder STB verifies VRF the presence of a compatible protective module HCP2 on the rendering device TV1.

In a fifth step ET15, the decoder STB receives a reply RSP from the rendering device TV1.

Depending on the result of the verifying step, in a sixth step ET16, the decoder STB transmits or does not transmit the protected content PC.

If the modules are compatible (case not shown in FIG. 4), the protected content PC is encrypted by the protective module HDPC1 and transmitted from the decoder STB to the rendering device TV1 with a view to a rendition. We will not go further into the details of operation of the protective modules because it is irrelevant to the description of the present disclosure.

If the protective modules are incompatible, for example because the versions of the protective modules HDCP1 and HDCP21 differ, the decoder STB requests, in the sixth step ET16, the unprotected content NPC received from the server be rendered.

Following transmission of the unprotected content NPC, the latter is rendered on the rendering device rendering device TV1.

The unprotected content NPC for example contains information on the result of the verifying step. The message is for example "rendition is not possible because of an incompatibility between your decoder and your television set".

According to one variant of the first embodiment described above, in the second step, the decoder STB explicitly asks to receive, from the server SRV, the unprotected content NPC associated with the protected content. In FIG. 1, in the first step, the reference NPC has been placed between parentheses to illustrate this possibility.

According to another variant of the first embodiment, the unprotected content NPC is requested only if the protective modules are found to be incompatible in the fourth step ET4.

According to one embodiment, which will possibly be employed as an alternative or in addition to the preceding embodiment, instead of being transmitted by the server, the protected content NPC is stored beforehand in the memory of the decoder STB, transmission of an unprotected content NPC by the server SRV not being required to do so.

In this configuration, the steps referenced ET21 to ET26 are the same as those described with reference to FIG. 4 with the exception of step ET22; in step ET22, the server SRV does not transmit the unprotected content (NPC) to the decoder STB.

In a third embodiment, the system SYS is considered to comprise a plurality of rendering devices, two rendering devices for example, namely a first rendering device TV1 and a second rendering device TV2. In this third embodiment, it will be seen that the decoder STB is capable of identifying a rendering device TV2 that is separate from and compatible with the first device TV1 in the local network.

The two rendering devices TV1 and TV2 are considered to be equipped with protective modules HDCP21 and HDCP22, respectively, and only the version of the protective module HDCP22 of the rendering device TV2 is considered to be compatible with the protective module HDCP1 of the decoder STB.

Furthermore, only the rendering device TV1 is paired with the decoder STB. In other words, at a time t a request to render a content made by the decoder STB is automatically transmitted to the first rendering device TV1.

Steps ET31 to ET34 are the same as steps ET11 to ET14, or as steps ET21 to ET24, respectively, depending on whether it is desired for the server to transmit the unprotected content NPC or not.

In this third embodiment, in the fifth step ET35, the managing entity ENT1 compares the protective modules and concludes that the protective modules HDCP1 and HDCP21 are incompatible, for example because the versions of the modules differ.

In a sixth step ET36, the decoder STB, by which is meant the managing entity ENT1, searches SCH for a rendering device TVm the protective module HDCP2m of which is compatible with the protective module of the decoder STB.

As seen above, the protective module HDCP22 (m=2) is compatible with the protective module HDCP1.

In a seventh step ET37, the decoder STB receives a reply from the rendering device TV2, and compares at that moment then the versions of the protective modules HDCP1 and HDCP22. The entity ENT1 notes the compatibility between the two protective modules.

Next, in an eighth step ET38, the decoder STB requests the unprotected content NPC (TV2) be rendered, the unprotected content including an indication relative to the fact that a rendering device other than that defined by default, in the present case the second rendering device TV2, is able to render the protected content PC. The interface for example comprises a region to be selected so as to validate a rendition on the rendering device TV2 instead of the rendering device TV1 defined by default.

It is assumed that a user validates, in a ninth step ET39, the use of the rendering device TV2 instead of the first rendering device TV1 for the rendition of the protected content PC. The validation a datum representative of a validation and triggers a step of requesting rendition of the protected content on said other rendering device. The datum representative of a validation is for example a binary code generated by the remote control and interpretable by the processor of the reader terminal STB.

On receipt of the datum representative of the validation, in a tenth step ET40, the decoder STB requests the protected content PC be rendered on the second rendering device TV2. In our example, the rendition is preceded by pairing of the decoder STB and the second rendering device TV2 if pairing is necessary, and in particular when the connection is a wireless Wi-Fi connection. This pairing is not necessary for example when the reader terminal is connected to the second rendering device TV2 via a wired connection (HDMI cable or equivalent).

In the various embodiments described above, the unprotected content is for example the first few minutes of the film or an extract from the film.

In the third embodiment, the duration of the unprotected content may be chosen to be long enough to ensure a continuity between the rendition of the unprotected content on the rendering device TV1 and on the rendering device TV2. In this way, if the unprotected content corresponds to the first few minutes of a film, the ability to switch to a second rendering device TV2 ensures a quasi-continuous rendition of the protected content.

Lastly, it will be noted here that, in the present text, the term "module" or "entity" may correspond equally to a software component or to a hardware component or to a set of software and hardware components, a software component itself corresponding to one or more computer programs or subroutines or, more generally, to any element of a program able to implement a function or a set of functions such as described for the modules in question. In the same way, a hardware component corresponds to any element of a hardware assembly able to implement a function or a set of functions for the module in question (integrated circuit, chip card, memory card, etc.).

The invention claimed is:

1. A method comprising:

managing transmission of a multimedia content protected against copying, referred to as protected content, from a reader terminal to a rendering device via a communication link with a view to a rendition on the rendering device, the reader terminal comprising a first protective module, the managing being performed by a hardware component and comprising acts of:

requesting reception of the protected content;

in response to the requesting, receiving both the protected content and an unprotected content from a communication network;

subsequently to the receiving act and on receipt of the protected content, verifying presence on the rendering device of a second protective module compatible with the first protective module; and in response to non-presence of the second protective module, transmitting to the rendering device, via the communication link, a request to render, on the rendering device, the unprotected content instead of the protected content.

2. The method according to claim 1, further comprising the hardware component transmitting a request to access the protected content, wherein the request to access further includes a request to receive the unprotected content, prior to performing the act of receiving the protected content and the unprotected content.

3. The method according to claim 1, further comprising obtaining the unprotected content from a memory included in the rendering device.

4. The method according to claim 1, further comprising the hardware component searching for another rendering device equipped with a third protective module compatible with the first protective module, prior to performing the act of transmitting, and, in response to the compatible third protective module being found, including a datum representative of a result of the search in the unprotected content transmitted in the act of transmitting.

5. The method according to claim 4, further comprising, following the transmitting act, the hardware component receiving a datum representative of a validation, which triggers the hardware component to request rendition of the protected content on said other rendering device.

6. A hardware component for managing transmission of a protected multimedia content from a reader terminal to a rendering device via a communication link, the reader terminal being able to receive protected contents with a view to rendition thereof on the rendering device, the reader terminal comprising a first protective module, the hardware component comprising:

a processor; and a non-transitory computer-readable medium comprising instructions stored thereon which when execute by the processor configure the hardware component to:

requesting reception of the protected content;

in response to the requesting, receiving both the protected content and an unprotected content from a communication network;

subsequently to the receiving act and on receipt of the protected content, verify presence on the rendering device of a second protective module compatible with the first protective module; and depending on the presence, transmit to the rendering device via the communication link, a request to render the unprotected content instead of the protected content.

7. The hardware component according to claim 6, wherein the hardware component is implemented in the reader terminal.

8. A non-transitory computer readable medium comprising program-code instructions stored thereon which when executed by a hardware component configure the hardware component to perform a method comprising:

managing transmission of a multimedia content protected against copying, referred to as protected content, from a reader terminal to a rendering device via a communication link with a view to a rendition on the rendering device, the reader terminal comprising a first protective module, the managing comprising acts of:

requesting reception of the protected content;

in response to the requesting, receiving both the protected content and an unprotected content from a communication network;

subsequently to the receiving act and on receipt of the protected content, verifying presence on the rendering device of a second protective module compatible with the first protective module; and in response to non-presence of the second protective module, transmitting to the rendering device, via the communication link, a request to render, on the rendering device, the unprotected content instead of the protected content.

* * * * *